March 18, 1969 J. A. W. BUTCHER ETAL 3,433,902
SPEECH IMMUNITY VOICE FREQUENCY SIGNALLING SYSTEMS
Filed Oct. 31, 1966
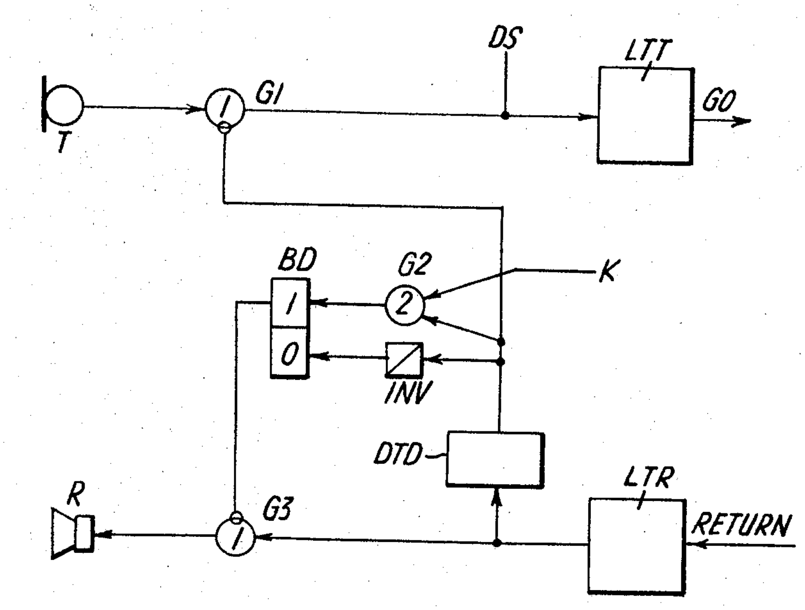

United States Patent Office 3,433,902

Patented Mar. 18, 1969

3,433,902

SPEECH IMMUNITY VOICE FREQUENCY SIGNALLING SYSTEMS

John Anthony Weeks Butcher, Stansted, Geoffrey George Pullum, Shenfield, and Michael John Willson, Ruislip, England, assignors to International Standard Electric Corporation, New York, N.Y., a corporation of Delaware Filed Oct. 31, 1966, Ser. No. 590,913
Claims priority, application Great Britain, Nov. 19, 1965, 49,260/65
U.S. Cl. 179—84 6 Claims
Int. Cl. H04m *1/19, 1/00*

ABSTRACT OF THE DISCLOSURE

Upon detection of dial tone, a gate is disabled so that transmitter is disconnected from line. Provision is made for preventing dial tone from reaching receiver while transmitting selection signals.

The present invention relates to voice-frequency signalling systems, and especially to methods of and apparatus for providing speech immunity in such systems.

In certain communication systems in which multi-voice frequency signalling is used in place of conventional loop-disconnect dialling from the subscriber's telephone instruments, it may be necessary to transmit such signals over trunk circuits on which the power level of such signals is limited.

An object of the present invention is to readily permit such speech immunity to be attained in such systems.

In accordance with the present invention, there is provided a method of providing speech immunity for voice-frequency signals transmitted from a telephone subscriber's instrument, which signals represent the identity of a wanted subscriber's line, in which a proceed to send signal (hereinafter called dial tone), and which is received from the exchange, is used to disable the speech transmitting means by which the subscriber's speech is transmitted for as long as said signals are being transmitted.

An embodiment of the present invention will now be described with reference to the accompanying highly simplified block schematic.

The accompanying drawing shows only as much of a telephone subscriber's instrument and its circuitry as is necessary to understand the present invention. It is assumed that the system is one in which the connections between the instruments and the exchange are four wire connections, there being a separate go channel and return channel.

When the subscriber lifts his handset, a proceed to send tone, which corresponds to the converted dial tone is provided, in some known manner, from the exchange, reaching the subscriber's set over the return channel. It is applied thereto via a line transformer which forms part of the circuit elements included in the box LTR. The output of LTR is connected to a proceed to send tone detector DTD, whose output is connected to an inhibit input of a gate G1. This gate G1 is a so-called analogue gate, since it is included in the speech output circuit from the transmitter T on the subset. The presence of an input signal on the inhibit input disables this analogue gate. One possible form of analogue gate which could be used here is the emitter-collector path of a transistor, the inhibiting input being applied to the base of that transistor.

The gate G1 already referred to is between the transmitter T and a further box LTT, which includes the line transformer for the outgoing speech and other signals. The key set by which the subscriber transmits the wanted number is not shown, but the voice frequency signals are applied to the outgoing channel, for instance, via the connection DS, so they pass through the transformers and other circuitry included in the box LTT.

Since the tone detector DTD has closed the gate G1, it will be appreciated that speech or any other output from the transmitter T is prevented from reaching the line. At the exchange the proceed to send tone is removed, when the signals identifying the wanted line end (that is, when the keyed voice-frequency signals have ceased).

In certain cases it may be considered desirable for the proceed to send tone to be removed from the receiver as soon as the subscriber commences to transmit the voice-frequency signals identifying the wanted line. For this purpose a bistable device BD is provided, which is set to its operated condition via a gate G2 in response to a coincidence of a proceed to send tone detected by the detector DTD and any one of the push button of a keyset operated. If any of these push buttons are operated the input K to the gate G2 is energised. Hence as long as the subscriber is transmitting the wanted number, BD is maintained in its operated condition. As soon as BD assumes its operated condition, which occurs when the subscriber commences to key the wanted number, the output therefrom disables the inhibit gate G3, which is a gate similar to the gate G1. Consequently as far as the subscriber is concerned proceed to send tone disappears from the sounds reaching his ear as soon as he commences to send the wanted number.

When the exchange recognises from the voice-frequency signals which reach it that the wanted number has been completely received, it removes the proceed to send tone from the return channel. The removal of this signal has the result that the output of the detector DTD disappears, so that gate G1 is no longer disabled, and gate G2 can no longer be operated. In addition the inverter INV delivers an output to reset the bistable device to its non-operated condition. This inverter INV, is of course, a so-called logical inverter. That is, it gives an output when it has no input and vice versa. The re-setting of BD to its non-operated condition removes the inhibit condition from the gate G3, with the result that the return path is now connected via the transformer and other circuitry LTR and the gate G3 to the receiver R.

There are certain other signals which, in specialised communication systems, may also be conveyed by voice-frequency, but these signals rely on their persistence to provide speech immunity. Consequently they are not affected by the arrangements described therein. However, they would also be transmitted at the relatively low power level which is permissible for the voice-frequency "dialling" signals used in the arrangement described above.

Although the arrangement described herein assumes a four-wire line circuit arrangement, it will be appreciated that it can be used in a two-wire system. Furthermore, the basic four-wire system for interconnecting the subscriber's instruments at the exchange can be replaced by a duplex radio channel. Such a replacement possibility provides one of the advantages of the present arrangement over a system in which line reversal from the exchange is used for this purpose. The present system is also advantageous as a so-called frequency division multiplex (i.e. multi-channel carrier) system where high level voice-frequency signals cannot readily be handled.

An arrangement in which the receiver is not inhibited during the transmission of wanted number identifying signals has a certain advantage. This applies in a system such as that assumed in the present arrangement, wherein the exchange, when it recognises that the wanted number identifying signals have ended removes the proceed to send tone from the line. Consequently if the receiver is not inhibited the disappearance of this tone can be interpreted by the calling subscriber's that an indication at the exchange has recognised the fact that he has transmitted the whole of the wanted number. This advantage is of particular significance where the so-called "progressive dialling" technique is used. This technique means that the subscriber has to transmit the wanted number in several portions, the time at which each portion has to be sent being indicated to him by the reception of a further proceed to send tone.

It is to be understood that the foregoing description of specific examples of this invention is made by way of example only and is not to be considered as a limitation on its scope.

We claim:

1. A speech immunity system for voice frequency digital signals transmitted from a subscriber telephone instrument comprising speech transmitter means for transmitting voice signals from said instrument, means responsive to an off-hook condition at said subscriber instrument for transmitting a voice frequency dial tone to said instrument, means in said instrument responsive to receipt of said dial tone for disabling said transmitter means, and means for maintaining said transmitter means in said disabled condition as long as said instrument is sending said voice frequency digital signals.

2. The system as claimed in claim 1, wherein each telephone subscriber's instrument is connected to a telephone exchange via a four-wire line which provides separate go and return channels.

3. The system as claimed in claim 1 wherein said telephone instrument has a speech receiver, and means for disabling the receiver when the subscriber commences to transmit the voice-frequency signals which identify the wanted line.

4. The system of claim 1 in which said speech transmitting means is connected to the outgoing channel towards the exchange via a normally-open gate means, the means responsive to the receipt of said voice frequency dial tone causing said gate to be closed.

5. The system of claim 1 and speech receiver means, and means for disabling the receiver while the subscriber is transmitting the wanted number in order to remove dial tone.

6. The system of claim 1 wherein said telephone instrument has a speech receiver and a second coincidence gate means in said instrument which responds to the coincidence of the detection of said voice frequency dial tone and of the operation of said speech transmitter means, a bistable device which is set to its operated condition when said second gate responds, a third gate means which normally interconnects the receiver of the instrument with the incoming channel from the exchange, means for disabling said third gate when said bistable device is set to its operated condition, and an inverter means which responds to the disappearance of said dial tone which occurs when the wanted number has been fully received at the exchange for resetting said bistable device to its non-operated condition, whereupon both said receiver and transmitter are no longer disabled.

References Cited

UNITED STATES PATENTS 3,270,144 8/1966 Vogel et al.

KATHLEEN H. CLAFFY, *Primary Examiner.*

W. A. HELVESTINE, *Assistant Examiner.*

U.S. Cl. X.R.

179—81